United States Patent [19]

Richards

[11] 4,085,626

[45] Apr. 25, 1978

[54] TWO HANDED MOMENTARY ACTUATOR

[76] Inventor: Fred F. Richards, 6837 Chevy Chase, Dallas, Tex. 75225

[21] Appl. No.: 731,208

[22] Filed: Oct. 12, 1976

[51] Int. Cl.² ............................................. F16H 21/44
[52] U.S. Cl. ................................ 74/110; 192/131 R; 361/192; 83/62; 83/1
[58] Field of Search ............... 74/99 A, 110; 192/131; 83/DIG. 1, 58, 62; 361/192

[56] References Cited

U.S. PATENT DOCUMENTS

| | | | |
|---|---|---|---|
| 2,962,633 | 11/1960 | Raymond | 83/DIG. 1 |
| 3,703,833 | 11/1972 | Olah | 74/110 |
| 3,805,085 | 4/1974 | Andrews | 361/189 |
| 3,877,858 | 4/1975 | Smith | 83/DIG. 1 |
| 3,933,065 | 1/1976 | Janu et al. | 361/190 |

Primary Examiner—Benjamin W. Wyche
Assistant Examiner—Wesley S. Ratliff, Jr.

[57] ABSTRACT

A control in which an active member is momentarily actuated by a moving member only when both members move toward each other and pass each other, the active member being actuated by the moving member as it passes said active member from one direction only, when said members meet and pass in the opposite direction said active member will not be activated, the movement of either member being limited so that the two members can pass each other only when both members move towards each other along parallel paths.

2 Claims, 7 Drawing Figures

TWO HANDED MOMENTARY ACTUATOR

BACKGROUND OF THE INVENTION

This invention relates to manually actuated devices for tripping, or otherwise controlling, punch presses, brakes, bending machines, or any other type of machinery where operator safety requires that both hands of the operator be withdrawn from the machinery before the machine can be tripped.

Devices of the type mentioned are known in the prior art and are customarily actuated by spaced hand or palm actuator buttons. Many prior art devices can be defeated by tying one button down, thus enabling the operator to actuate the machine with one hand. Further, those prior art devices which are mechanically interlocked in such a way as to require the use of both hands are not one-cylce devices and the machine will continue to operate as long as both hands remain on the palm buttons.

OBJECTS OF THE INVENTION

The prime object of this invention is to provide a control which requires the use of both hands applied simultaneously, but not necessarily in unison.

Another object of my invention is to provide a control which permits a machine to operate for one complete cycle only regardless of how long the operators' hands have been applied to the actuator buttons.

Another object of my invention is to provide a control which requires that the operator release both hands simultaneously from the controls before the machine can be again actuated.

A still further object of my invention is to provide a control in which one actuator button of a two button hand operated mechanism cannot be tied down or abridged and the machine actuated by the other button.

Another object of this invention is to provide a durable and troublefree device without complicated parts.

For the purpose of clarifying the nature of the present invention, one of several exemplary embodiments of the invention is illustrated in the hereinbelow described figures of the accompanying two drawing sheets and is described in detail hereinafter.

Figure 1:
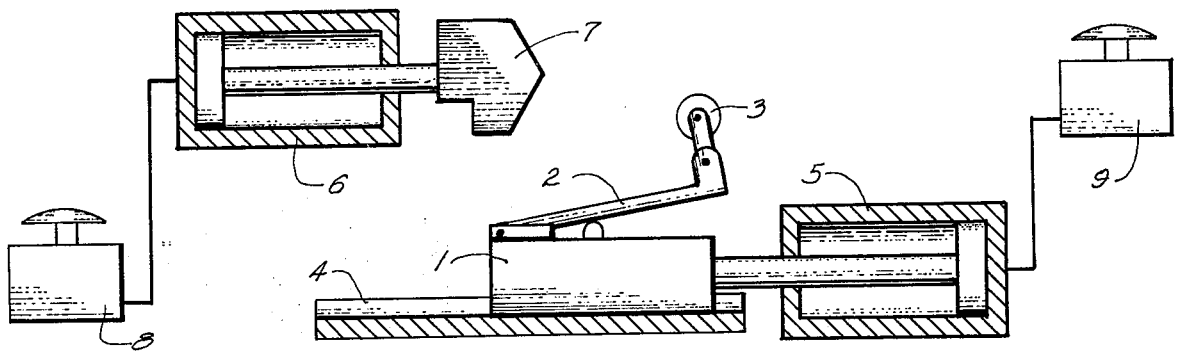
FIG. 1 is an elevation view showing the apparatus at rest.

Referring now to the drawings in detail wherein like reference numerals indicate like parts throughout the several figures, the reference number 1 indicates a valve or switch to which is hingedly mounted a lever 2, at the free end of said lever 2 is hingedly mounted a spring loaded member 3, said member 3 being hingably movable against the spring load, but not movable in relation to said lever 2 in the opposite direction.

Said valve 1 is slideably mounted on a fixed guide-way 4 and a pneumatic cylinder 5 is attached to said valve 1 whereby said cylinder 5 can move said valve 1 forward and back on said guide-way 4.

A second pneumatic cylinder 6 is mounted parallel to cylinder 5 and to the ends of the cylinder rod in second cylinder 6 is attached a cam 7. In this embodiment of the invention the actuating mechanism includes a cam 7 arranged so that when said cam 7 is advanced by second cylinder 6 it will be in the path of spring-loaded member 3.

Figure 2:
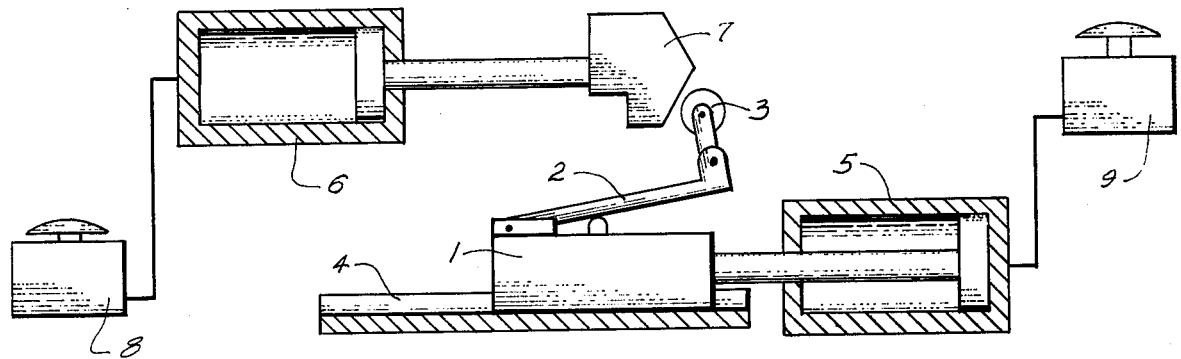
FIG. 2 is an elevation view showing one hand valve depressed and the cam cylinder advanced.
Figure 3:
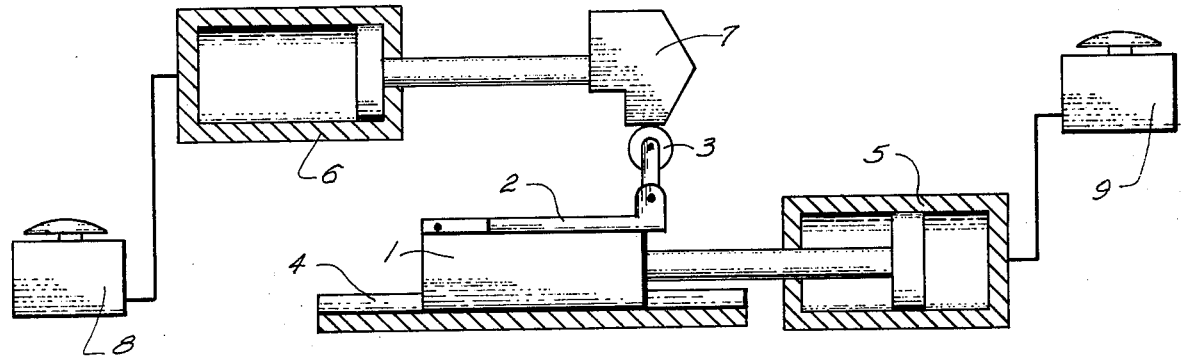
FIG. 3 is an elevation view showing both hand valves depressed and illustrating the relationship of functional parts at the moment of momentary valve actuation.

At rest, the parts would appear as in FIG. 1 with both cylinders 5 and 6 retracted. When an operator presses hand-valve 8, second cylinder 6 will advance cam 7 to a position illustrated in FIG. 2. Cam 7 is extended as far as it can go without engaging spring-loaded member 3. Regardless of how many times hand-valve 8 is actuated cam 7 will advance to the same position relative to second cylinder 6 every time. Now with cam 7 extended when hand-valve 9 is actuated, cylinder 5 will advance valve 1 causing spring-loaded member 3 to strike cam 7. When spring-loaded member 3 interacts with cam 7, lever 2 is forced to actuate valve 1 as illustrated in FIG. 3.

Figure 4:
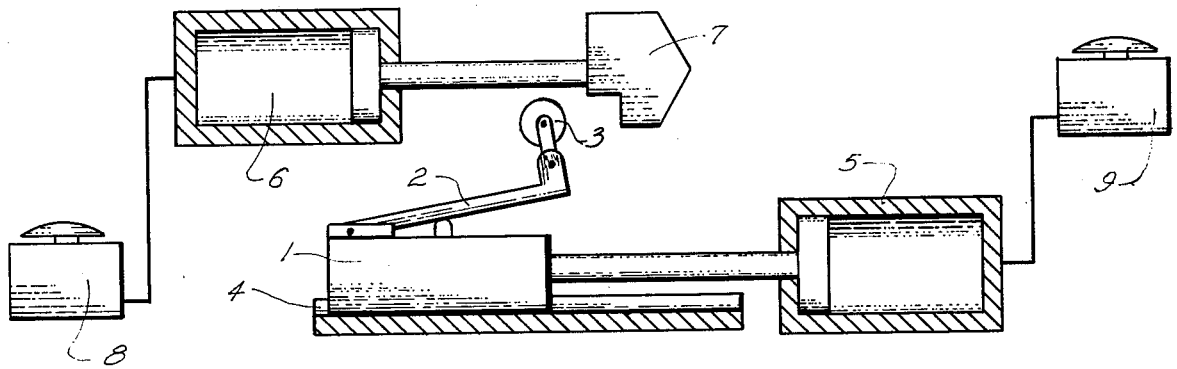
FIG. 4 is an elevation view with both hand valves depressed and illustrating the relationship of functional parts after momentary valve actuation and the cam and valve have passed each other.

Since the full stroke of cylinder 5 carries spring-loaded member 3 past cam 7, valve 1 is deactuated as soon as spring-loaded member 3 disengages cam 7. Therefore, a momentary actuation of valve 1 occurs only during the time cam 7 and spring-loaded member 3 are passing each other on the advance strokes of either or both cylinders. FIG. 4 illustrates the relative position of the various parts following the momentary actuation of valve 1.

Figure 5:
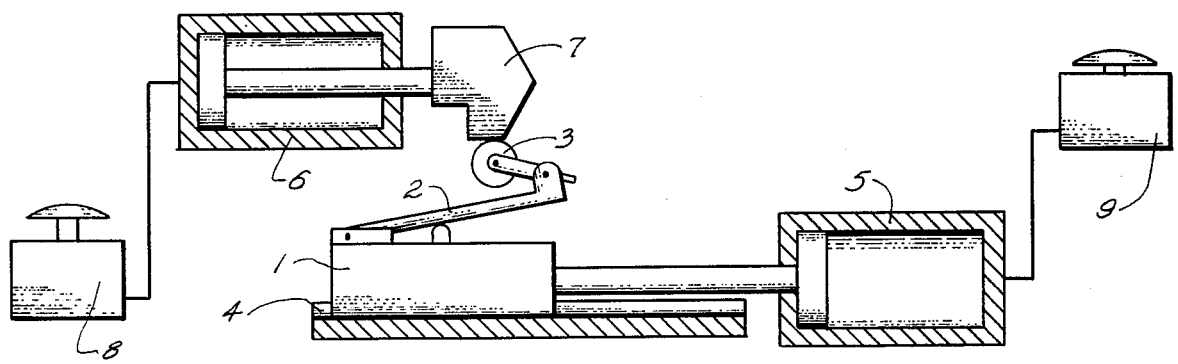
FIG. 5 is an elevation view in which the hand has been removed from the cam cylinder control and the valve cylinder control is still depressed.

If the operator releases hand-valve 8 while still holding hand-valve 9, cam 7 will be retracted by second cylinder 6 and spring-loaded member 3 will hinge back on lever 2 as illustrated in FIG. 5, but valve 1 will not actuate.

Figure 6:
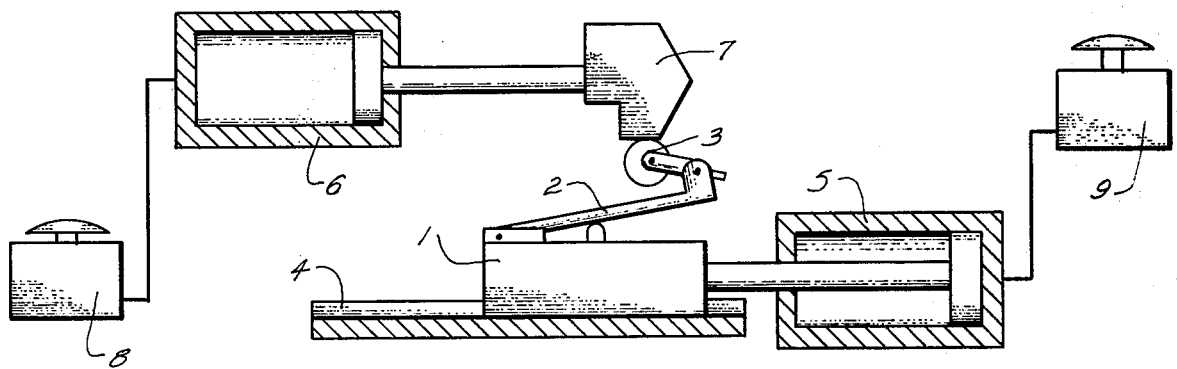
FIG. 6 is an elevation view in which the hand has been removed from the valve cylinder control and the cam cylinder control is still depressed.

If the operator releases hand-valve 9 while still holding hand-valve 8, cylinder 5 will retract valve 1 as illustrated in FIG. 6 and spring-loaded member 3 will be hinged back on lever 2, but valve 1 will not actuate. Both hand valves 8 and 9 must be released at the same time to permit spring-loaded member 3 to return to its stopped position as shown in FIG. 1.

Figure 7:
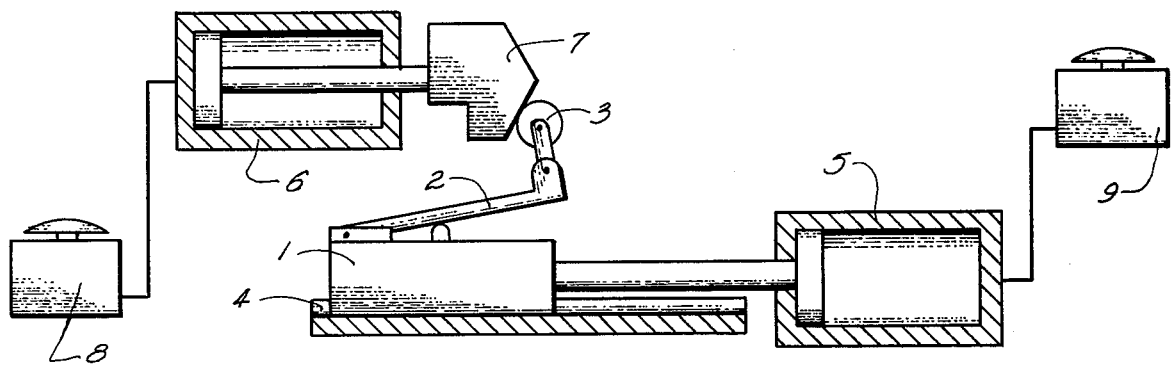
FIG. 7 is an elevation view showing one hand valve depressed and the valve cylinder advanced.

When an operator presses hand-valve 9 before pressing hand-valve 8, cylinder 5 advances valve 1 as illustrated in FIG. 7 to place spring-loaded member 3 in the path of cam 7 so that when cam 7 is advanced, it will actuate valve 1 as cam 7 passes in a direction opposed to the stopped hinge of spring-loaded member 3. Cam 7 having actuated valve 1, it will continue past spring-loaded member 3 permitting valve 1 to deactuate. Then when either cylinder 5 or second cylinder 6 is retracted independently, the spring-loaded member 3 will hinge back on lever 2 and valve 1 will not be actuated as shown in FIG. 5 and FIG. 6.

Valve 1 can only be actuated following simultaneous release of hand-valves 8 and 9 and the retraction of cylinders 5 and 6 together with the restoration of valve 1 and cam 7 to the relative positions shown in FIG. 1.

This construction provides for momentary actuation of a switch mechanism in one direction of movement of the reciprocal members upon successive reciprocations thereof. This actuating mechanism is simple to construct, has a minimum number of parts, may be readily assembled and can be readily attached to conventional switch or valve operated devices.

I claim:

1. In an actuating mechanism for an operator actuated device, the combination of two members movable between opposite positions, support means for mounting said members on said device, a cam member extending from the longitudinal axis of one movable member and aligned to travel parallel to a guide-way, a toggle-lever operated member extending from the longitudinal axis of a second movable member, said toggle-lever operated member being mounted to travel on said guide-way opposite the direction of travel of said cam member, said movable members having longitudinal axis parallel to each other and to said guide-way, said cam and said toggle-lever operated member being aligned and disposed to engage said cam and said toggle-lever only when said cam and said toggle-lever have both been moved toward each other, said toggle-lever hingedly supported on an actuating member to move as a rigid unit therewith when engaged by said cam in one direction of movement, said toggle-lever being supported on said actuating member to pivot thereon and to ride over said cam without moving actuating member when said cam moves in the opposite direction.

2. In an actuating mechanism for an operator actuated electric switch or pneumatic valve, the combination of two movable members movable in opposite directions, a toggle-lever operated switch or valve attached to and movable by one driving member, said cam being aligned to intercept the path of said toggle-lever and said cam acting together to operate said switch or valve when said toggle-lever and said cam meet and pass each other being hingedly mounted to pivot and to ride over said cam without activating said valve when said movable members are driven in the opposite direction, means of limiting travel of both movable members whereby the full travel of one movable member towards the other movable member will not engage said cam with said toggle-lever sufficient to actuate said switch or valve, means limiting travel of both movable members toward each other whereby when both movable members move toward each other said cam will pass said toggle-lever and actuate said switch or valve only while said cam and said toggle-lever are engaged in meeting and passing each other, means limiting travel of both movable members toward each other whereby said cam and said toggle-lever will pass each other when both movable members are fully extended toward each other, means of limiting travel of both movable members in either direction whereby said toggle-lever hinges to ride over said cam when either movable member, moving separately, moves in the opposite direction after both movable members have been fully extended toward each other, said toggle-hingedly spring biased to move as a rigid unit with said lever only after both movable members have moved to the limit of their respective travel in a direction away from each other.

* * * * *